(12) United States Patent
Li

(10) Patent No.: US 9,493,693 B2
(45) Date of Patent: Nov. 15, 2016

(54) SOY ADHESIVES AND COMPOSITES MADE FROM THE ADHESIVES

(75) Inventor: Kaichang Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 0 days.

(21) Appl. No.: 13/825,114

(22) PCT Filed: Sep. 15, 2011

(86) PCT No.: PCT/US2011/051819
§ 371 (c)(1),
(2), (4) Date: Mar. 19, 2013

(87) PCT Pub. No.: WO2012/040037
PCT Pub. Date: Mar. 29, 2012

(65) Prior Publication Data
US 2013/0302631 A1    Nov. 14, 2013

Related U.S. Application Data

(60) Provisional application No. 61/384,603, filed on Sep. 20, 2010.

(51) Int. Cl.
C09J 189/00 (2006.01)
C08L 97/02 (2006.01)
B32B 21/08 (2006.01)

(52) U.S. Cl.
CPC .............. *C09J 189/00* (2013.01); *B32B 21/08* (2013.01); *C08L 97/02* (2013.01); *Y10T 428/31978* (2015.04)

(58) Field of Classification Search
None
See application file for complete search history.

(56) References Cited

U.S. PATENT DOCUMENTS

| | | | |
|---|---|---|---|
| 1,703,133 A | 2/1929 | Bradshaw et al. | |
| 1,751,339 A | 3/1930 | Laucks et al. | |
| 1,813,377 A | 7/1931 | Banks | |
| 1,829,259 A | 10/1931 | Bradshaw et al. | |
| 1,835,689 A | 12/1931 | Banks et al. | |
| 1,854,703 A | 4/1932 | Laucks et al. | |
| 1,871,329 A | 8/1932 | Laucks et al. | |
| 3,274,042 A | 9/1966 | Gilboe et al. | |
| 3,494,775 A | 2/1970 | Coscia et al. | |
| 4,352,692 A * | 10/1982 | Krinski et al. | 106/614 |
| 5,364,465 A | 11/1994 | Poppe et al. | |
| 5,374,670 A | 12/1994 | Ayorinde et al. | |
| 5,766,331 A * | 6/1998 | Krinski et al. | 106/157.2 |
| 5,858,553 A | 1/1999 | Wu | |
| 7,022,355 B2 | 4/2006 | Cho | |
| 7,060,798 B2 | 6/2006 | Li et al. | |
| 7,252,735 B2 | 8/2007 | Li | |
| 7,722,712 B2 | 5/2010 | Li | |
| 2002/0005251 A1 | 1/2002 | Sun et al. | |
| 2004/0089418 A1 | 5/2004 | Li | |
| 2007/0240823 A1* | 10/2007 | Alevisopoulos et al. | 156/336 |
| 2010/0093896 A1 | 4/2010 | Spraul et al. | |
| 2010/0227040 A1 | 9/2010 | Muraoka et al. | |

FOREIGN PATENT DOCUMENTS

| | | |
|---|---|---|
| EP | 2005836 A2 | 12/2008 |
| EP | 2005836 A9 | 12/2008 |
| WO | WO 99/61538 | 12/1999 |
| WO | WO 2005/072260 | 8/2005 |
| WO | WO 2005/113700 | 12/2005 |
| WO | WO 2010/003054 | 1/2010 |
| WO | WO 2010/039489 | 4/2010 |

OTHER PUBLICATIONS

Zajaczkowski, Pressure Sensitive Adhesives in High Performance Applications, The Adhesive and Sealant Council, Jun. 2010.*
Burnett, Soybeans and Soybean Products, vol. II., pp. 1019-1027 (1951).
International Search Report and Written Opinion from International Application No. PCT/US2011/051819, dated Oct. 18, 2011, 13 pp.
Lambuth, Protein Adhesives for Wood.
Skeist, Handbook of Adhesives ($2^{nd}$ ed.), Chap. 10 Soybean Glues (Lambuth), pp. 172-180 (1977).

* cited by examiner

*Primary Examiner* — Alexandre Ferre
(74) *Attorney, Agent, or Firm* — Klarquist Sparkman, LLP

(57) ABSTRACT

A formaldehyde-free aqueous adhesive composition comprising (a) soy protein and (b) magnesium oxide or a mixture of magnesium oxide and magnesium hydroxide, wherein components (a) and (b) together constitute at least 50 weight percent of the composition, excluding the weight of the water.

36 Claims, No Drawings

SOY ADHESIVES AND COMPOSITES MADE FROM THE ADHESIVES

CROSS REFERENCE TO RELATED APPLICATIONS

This application is the U.S. National Stage of International Application No. PCT/US2011/051819, filed Sep. 15, 2011, which was published in English under PCT Article 21(2), which claims the benefit of and priority to U.S. Provisional Application No. 61/384,603 filed Sep. 20, 2010, which is incorporated herein by reference in its entirety.

FIELD

The present disclosure relates to soy adhesives for making lignocellulosic composites.

BACKGROUND

Lignocellulosic-based composites are formed from small dimension pieces of cellulosic material that are bonded with an adhesive (i.e., a binder). In general, solid wood is fragmented into smaller pieces such as strands, fibers, and chips. An adhesive composition then is added to the wood component. The resulting mixture is subjected to heat and pressure resulting in a composite. The adhesive mix typically is the only non-lignocellulosic component.

The most commonly used wood adhesives are phenol-formaldehyde resins (PF) and urea-formaldehyde resins (UF). There are at least two concerns with PF and UF resins. First, volatile organic compounds (VOC) are generated during the manufacture and use of lignocellulosic-based composites. For example, the California Air Resources Board (CARB) estimates that as much as 400 tons of formaldehyde is emitted from wood composite products bonded with UF resins each year in California. An increasing concern about the effect of emissive VOC, especially formaldehyde, on human health has prompted a need for more environmentally acceptable adhesives. Second, PF and UF resins are made from petroleum-derived products. The reserves of petroleum are naturally limited. The wood composite industry would greatly benefit from the development of formaldehyde-free adhesives made from renewable natural resources.

Soy protein was used as a wood adhesive for the production of plywood from the 1930's to the 1960's. Petroleum-derived adhesives replaced soy protein adhesives due to the relatively low bonding strength and water resistance of soy protein adhesives. However, soy protein is an inexpensive, abundant, renewable material that is environmentally acceptable.

SUMMARY

One embodiment disclosed herein relates to an aqueous adhesive composition comprising (a) soy protein and (b) magnesium oxide or a mixture of magnesium oxide and magnesium hydroxide, wherein components (a) and (b) together constitute at least 50 weight percent of the composition, excluding the weight of the water.

Also disclosed herein is an aqueous adhesive composition comprising (a) soy protein and (b) magnesium oxide or a mixture of magnesium oxide and magnesium hydroxide, wherein components (a) and (b) are the only active components in the composition.

Another embodiment disclosed herein relates to an aqueous adhesive composition comprising the reaction product of (a) soy protein and (b) magnesium oxide or a mixture of magnesium oxide and magnesium hydroxide, wherein components (a) and (b) together constitute at least 50 weight percent of the composition, excluding the weight of the water.

Also disclosed herein is an aqueous adhesive composition comprising the reaction product of (a) soy protein and (b) magnesium oxide or a mixture of magnesium oxide and magnesium hydroxide, wherein components (a) and (b) are the only active components in the composition.

A further embodiment relates to a formaldehyde-free adhesive composition, wherein the composition is made from the following active ingredients:
  (a) soy protein; and
  (b) magnesium oxide; wherein
  components (a) and (b) together constitute at least 50 weight percent of the active ingredients.

Also disclosed herein is a powder mixture comprising (a) soy protein powder and (b) magnesium oxide powder, wherein components (a) and (b) together constitute at least 50 weight percent of the mixture.

A further embodiment relates to a powder mixture comprising (a) soy protein powder and (b) magnesium oxide powder, wherein components (a) and (b) are the only active components in the composition.

An additional embodiment disclosed herein is a lignocellulosic composite comprising at least one first lignocellulosic substrate adhered to at least one second lignocellulosic substrate via an adhesive composition, wherein the adhesive composition comprises a reaction product of (a) soy protein and (b) magnesium oxide.

A further embodiment relates to a composition, comprising a mixture that includes (a) comminuted lignocellulosic particles (b) soy protein and (c) magnesium oxide or a mixture of magnesium oxide and magnesium hydroxide.

Also disclosed herein is a method for making a lignocellulosic composite comprising:
  contacting at least one lignocellulosic substrate with an adhesive comprising (a) soy protein and (b) magnesium oxide or a mixture of magnesium oxide and magnesium hydroxide; and
  bonding the adhesive-contacted lignocellulosic substrate to at least one other lignocellulosic substrate.

Another embodiment disclosed herein is a method for making an aqueous adhesive composition comprising:
  mixing together (a) soy protein powder and (b) magnesium oxide powder to form a powder mixture; and
  mixing the resulting powder mixture with water.

An additional disclosed herein relates to an aqueous adhesive composition comprising (a) lupine protein and (b) magnesium oxide or a mixture of magnesium oxide and magnesium hydroxide, wherein components (a) and (b) together constitute at least 50 weight percent of the composition, excluding the weight of the water.

An additional embodiment disclosed herein is a lignocellulosic composite comprising at least one first lignocellulosic substrate adhered to at least one second lignocellulosic substrate via an adhesive composition, wherein the adhesive composition comprises a reaction product of (a) lupine protein and (b) magnesium oxide.

A further embodiment relates to a composition, comprising a mixture that includes (a) comminuted lignocellulosic particles (b) lupine protein and (c) magnesium oxide or a mixture of magnesium oxide and magnesium hydroxide.

Also disclosed herein is a method for making a lignocellulosic composite comprising:

contacting at least one lignocellulosic substrate with an adhesive comprising (a) lupine protein and (b) magnesium oxide or a mixture of magnesium oxide and magnesium hydroxide; and bonding the adhesive-contacted lignocellulosic substrate to at least one other lignocellulosic substrate.

The foregoing will become more apparent from the following detailed description.

DETAILED DESCRIPTION

Embodiments of the adhesive composition can be made by reacting or mixing a soy protein with magnesium oxide. Both soy protein and magnesium oxide are substantially formaldehyde-free and would not generate volatile organic compounds in the preparation and use of the soy protein-magnesium oxide adhesive for making lignocellulosic composites. Thus, in certain embodiments, the adhesive composition is formaldehyde-free. The adhesive composition may be provided as a two-part system in which the protein comprises one part or package and the magnesium oxide comprises the second part or package. More preferably, soy protein powder and magnesium oxide powder are thoroughly mixed together to form a homogeneous powder mixture that is a first part of a two-part adhesive system. The solid soy protein-magnesium oxide powder mixture is shipped to end users, thus saving transportation cost. Prior to use for making lignocellulosic composites, the soy protein-magnesium powder mixture is mixed with water (the water is the second part of the two-part adhesive system). According to certain embodiments, no petrochemical-based products are used in this novel adhesive system and no formaldehyde or other volatile organic compounds are generated in the preparation and use of this adhesive.

Soy protein is an exemplary protein for use in the presently described adhesives. Soybeans contain about 38 wt % protein with the remaining portion comprising carbohydrates, oils, ash and moisture. Soybeans are processed to increase the amount of soy protein in the processed product. Soy protein products of any form may be utilized in the disclosed adhesive compositions. The three most common soy protein products are soy flour, soy protein concentrate, and soy protein isolate (SPI). One difference between these products is the amount of soy protein. For example, in certain embodiments, soy flour may typically include approximately 45-55 wt % protein, soy protein concentrate includes at least about 65 wt % protein (dry weight), and SPI includes at least about 85 wt % protein (dry weight). According to certain embodiments of the adhesive composition, the soy protein is soy flour.

Another protein for use in the presently described adhesives is lupine protein. In certain embodiments, lupine flour is the source for the lupine protein. Thus, lupine flour may be used as an ingredient in making the adhesive composition.

Magnesium oxide is a white odorless solid mineral that occurs naturally. Magnesium oxide is also commonly called magnesia. Magnesium oxide is hygroscopic in nature and reacts with water to form magnesium hydroxide, but is only very slightly soluble in pure water. Magnesium oxide can readily absorb carbon dioxide from the air to form magnesium carbonate. Magnesium oxide is commercially produced from magnesite ores or from sea water.

From 1930s to 1960s, soy-based adhesives were widely used for making plywood. Calcium oxide or calcium hydroxide was commonly incorporated in the soy-based adhesives as a base for adjusting pH. The usage of calcium oxide was typically less than 10% on a dry solid basis. However, the plywood panels bonded with the soy-based adhesives had poor water resistance, and often delaminated when they were soaked in water. The present inventor verified that plywood panels bonded with combinations of soy flour and calcium oxide could not pass the three-cycle soak test that is required for interior application of plywood panels. A long hot-press time such as 30 min hot-press time for making a $11/16''$ thick plywood panel was often required when soy-based adhesives containing calcium oxide were used for making plywood, which makes such soy-based adhesives useless in the modern production of plywood and other lignocellulosic composite panels where the hot-press time has to be very short (about 6 min hot-press time for making $11/16''$ thick plywood panels). The present inventor found that the combination of soy flour and calcium oxide became chunky aggregates, and thus could not be effectively coated onto wood to serve as an adhesive when the usage of calcium oxide was above 10%, such as 11%, on a dry solid basis.

It has been surprisingly discovered that a combination of soy protein and magnesium oxide is a superior wood adhesive that can be used in the modern, high speed production of lignocellulosic composites panels. Lignocellulosic composites panels such as plywood panels bonded with a soy protein-magnesium oxide adhesive can not only pass the three cycle soak test required for interior application, but also pass the two-cycle boil test required for exterior application.

The ingredients (for example, soy protein, magnesium oxide, and water) of the adhesive composition may be mixed together in any order and at standard temperature and pressure (i.e., about 25° C. and about 1 atmosphere). Preferably, soy protein and magnesium oxide powder are premixed well before mixing with water. A soy protein-magnesium oxide powder mixture can be easily shipped to customers resulting in reduced transportation costs. Homogeneous mixing of soy protein and magnesium oxide may be important for the superior performance of the adhesives. In certain embodiments, the mixture of soy protein and magnesium oxide is sufficiently homogeneous that the magnesium oxide content does not vary by more than 1% across the bulk of the mixture. The solids content of the resulting final adhesive mixture may be from 5 to 65 wt. %, more particularly from 25 to 50 wt %. Each (or only one) part of the adhesive system could be provided to the end user in the form of powder that is diluted by the end user to the appropriate mix ratios and solid contents.

In certain embodiments, the mix weight ratio of the soy protein to the magnesium oxide is 1000:1 to 1:10, more particularly 100:1 to 1:5, most particularly 10:1 to 3:1, especially 8:1 to 4:1, or 6:1 to 3:1, based on dry weight.

The pH value of the adhesive may be higher than 7. For instance, the pH of the adhesive composition may be raised up to 11 by adding certain ingredients such as sodium hydroxide, calcium oxide and/or a borate. The viscosity of the adhesive should be sufficiently low so that the adhesive can be easily coated or sprayed onto lignocellulosic substrates. The usage of the adhesive is dependent upon the type of wood composite panels. For example, the adhesive usage for plywood ranges from 4 mg/cm2 to 15 mg/cm on dry solids basis, depending on wood species and roughness of veneer surfaces.

In certain embodiments, magnesium oxide and soy protein are the primary ingredients of the composition in the sense that the magnesium oxide and the soy protein together constitute at least 50 weight percent, more particularly at least 75 weight percent of the composition, most particularly at least 90 weight percent, and especially at least 95 weight percent of the composition, excluding the weight of the water. In other words, in certain embodiments, magnesium oxide, soy protein and water are the only three ingredients of the composition. In other embodiments, the adhesive composition may include magnesium oxide, soy protein, water and less than 50 weight % of other additives, based on the total weight of the adhesive composition. For example, the adhesive composition also may include additives and fillers found in adhesives such as bactericides, insecticides, silica, wax, wheat flour, tree bark flour, nut shell flour, borate, antifoaming agent, viscosity modifier (e.g., sodium metabisulfite) and the like. In certain embodiments, the adhesive composition may include 0.5 weight percent, or less, of at least one additive selected from a borate, calcium oxide, and sodium hydroxide, based on dry weight. In particular embodiments, the adhesive composition may include 0.5 dry weight percent, or less, of a borate and calcium oxide, based on the combined weight of the borate and calcium oxide.

In certain embodiments, magnesium oxide and soy protein are the only adhesive-active components in the composition. As used herein, "adhesive-active" means that the component directly contributes to the adhesive bonding of the substrate. However, in other embodiments, the adhesive composition may include other adhesive-active ingredients such as a phenol-formaldehyde resin.

The magnesium oxide may be provided in the form of a magnesium oxide product that includes other components in addition to magnesium oxide. The MgO weight content in the magnesium oxide products should be higher than 50%, more particularly higher than 90%, even more particularly more than 98%. The magnesium oxide products may contain magnesium hydroxide, magnesium carbonate, calcium oxide, calcium carbonate, silica oxide, sodium silicate and other minerals. The particle size of the magnesium oxide products may be important for the superior performance of the soy protein-magnesium oxide adhesives. For example, the average particle size may be smaller than 20 mesh, more particularly smaller than 100 mesh, and even more particularly smaller than 300 mesh.

According to one approach, the soy protein component, the magnesium oxide component, water, and additives/fillers are mixed together a short time prior to use. The composition may have an open time of up to about one day, more particularly of up to about 5 days. As used herein, "open time" denotes the time from mixing of the two parts to the time at which the mixed composition cures to a point that it is no longer workable. In another approach, all the ingredients of the adhesive composition except water are pre-mixed together in a one-part system that is then supplied to an end user. In the one-part system, the adhesive composition can be mixed with water and then applied to a substrate.

The adhesive compositions are heat-curable. In other words, heating the adhesive mixture forms covalent bonds between the individual molecules of the adhesive composition and covalent and/or hydrogen bonds between molecules of the adhesive mixture and the lignocellulosic particles. Such curing typically occurs during the hot pressing step of the composite formation. Thus, the cure temperature of the adhesive composition is tailored so that it coincides with the heating temperatures used in composite formation. Such cure temperatures may range, for example, from about 80 to about 220° C., more particularly from about 100 to about 160° C. The adhesive mixture typically is not heated until after it has been applied to the lignocellulosic substrates.

Lignocellulosic composites that can be produced with the adhesives described herein include particleboard, plywood, oriented strand board (OSB), waferboard, fiberboard (including medium-density and high-density fiberboard), parallel strand lumber (PSL), laminated strand lumber (LSL), laminated veneer lumber (LVL), and similar products. In general, these composites are made by first blending comminuted lignocellulosic materials with an adhesive that serves as a binder to adhere the comminuted lignocellulosic materials into a unitary densified mass. Examples of suitable lignocellulosic materials include wood, straw (including rice, wheat and barley), flax, hemp and bagasse. The comminuted lignocellulosic materials can be processed into any suitable substrate form and size such as chips, flakes, fibers, strands, wafers, trim, shavings, sawdust, straw, stalks, shives, and mixtures thereof.

In certain embodiments, the moisture content of the lignocellulosic substrates may range from 2 to 10%, 3 to 9%, 4 to 8%, or 6 to 8%. For lignocellulosic substrates with low moisture content (e.g., less than 5% or less than 3%), the pH of the adhesive composition may be higher (e.g, 8 to 11, or 10 to 11).

The lignocellulosic materials are mixed together with the adhesive composition serving as a binder, and formed into a desired configuration to provide a pre-bonded assembly. The pre-bonded assembly then is subjected to heat and elevated pressure to provide the lignocellulosic composite product. For example, the pre-bonded assembly may be subjected to temperatures of from about 120 to 225° C. in the presence of varying amounts of steam, generated by liberation of entrained moisture from the lignocellulosic materials.

The amount of adhesive mixed with the lignocellulosic particles may vary depending, for example, upon the desired composite type, lignocellulosic material type and amount and specific adhesive composition. In general, about 1 to about 15, more particularly about 3 to about 10, weight percent adhesive may be mixed with the lignocellulosic material, based on the total combined weight of adhesive and lignocellulosic material. The mixed adhesive composition may be added to the comminuted lignocellulosic particles by spraying or similar techniques while the lignocellulosic particles are tumbled or agitated in a blender or similar mixer. For example, a stream of the comminuted lignocellulosic particles may be intermixed with a stream of the mixed adhesive composition and then be subjected to mechanical agitation.

In certain embodiments, a lignocellulosic composite composition may be made by mixing together soy protein, magnesium oxide, and comminuted lignocellulosic materials. The components may be mixed in any order. For example, the soy protein and magnesium oxide may be pre-mixed prior to mixing with the comminuted lignocellulosic materials. Alternatively, the soy protein and comminuted lignocellulosic materials may be pre-mixed, or magnesium oxide and the comminuted lignocellulosic materials may be pre-mixed.

The adhesive compositions also may be used to produce layered lignocellulosic composites. Soy protein and magnesium oxide may be applied to at least one lignocellulosic substrate, which is then bonded to at least one other lignocellulosic substrate. The soy protein, magnesium oxide, and water may be mixed together and then applied to the lignocellulosic composite. For example, the adhesive compositions can be used to produce plywood or laminated veneer lumber (LVL). The adhesive composition may be applied onto veneer surfaces by roll coating, knife coating, curtain coating, or spraying. A plurality of veneers are then laid-up to form sheets of required thickness. The mats or sheets are then placed in a heated press (e.g., a platen) and compressed to effect consolidation and curing of the materials into a board. Fiberboard may be made by the wet felted/wet pressed method, the dry felted/dry pressed method, or the wet felted/dry pressed method.

The presently disclosed adhesives provide a strong bond between the lignocellulosic substrates. The adhesives also provide structural composites with high mechanical strength. In addition, soy protein products, magnesium oxide and the adhesive compositions are substantially free of formaldehyde (including any compounds that may degenerate to form formaldehyde). For example, the soy protein product and the adhesive compositions do not contain any formaldehyde (and formaldehyde-generating compounds) that is detectable by conventional methods or, alternatively, the amount of formaldehyde (and formaldehyde-generating compounds) is negligible from an environmental and workplace regulatory standpoint.

The specific examples described below are for illustrative purposes and should not be considered as limiting the scope of the appended claims.

Example 1

Materials

Soy flour (SF) (7% moisture content) was provided by Cargill Incorporated (Minneapolis, Minn.). Magnesium oxide (98% MgO, and 320 mesh) was purchased from Contechem (Portland, Oreg.). Magnesium oxide (98% MgO and 200 mesh), magnesium hydroxide, magnesium carbonate hydroxide pentahydrate (($MgCO_3$)$_4$—$Mg(OH)_5$-$5H_2O$), and calcium oxide were purchased from Sigma-Aldrich (Milwaukee, Wis.). Yellow-poplar, maple, white fir, and pine veneers were a gift from Columbia Forest Products (Portland, Oreg.).

Example 2

Preparation of SF—MgO Adhesives With the Addition of SF to a Mixture of Magnesium Oxide and Water The following is a representative procedure for the preparation of SF—MgO adhesives with addition of SF to a mixture of MgO and water. MgO (84.7 g) and water (1656 mL) were mixed in a KitchenAid mixer for five min. SF (920 g, wet weight, 847 g dry weight) was added to the mixture and further mixed for 10 min. The total solids content of the resulting adhesive was 36%.

Example 3

Preparation of SF—MgO Adhesives With the Mixing of SF and MgO Before Mixing With Water The following is a representative procedure for the preparation of SF—MgO adhesives with the mixing of SF and MgO before mixing with water. MgO (84.7 g) SF (920 g, wet weight, 847 g dry weight) were mixed in a plastic bag. The resulting mixture was added to water (1656 mL) in a KitchenAid mixer while stirring and were mixed for 10 min. The total solids content of the resulting adhesive was 36%.

Example 4

Preparation of SF—$Mg(OH)_2$ Adhesives

SF—$Mg(OH)_2$ adhesives were prepared by following the procedures in Examples 2 and 3 except that MgO was replaced by $Mg(OH)_2$ and the dry weight ratio between soy flour and $Mg(OH)_2$ was 8:1. The total solids content of the resulting adhesive was 36%.

Example 5

Preparation of SF—$MgCO_3$—$Mg(OH)_2$ Adhesives

SF—$MgCO_3$—$Mg(OH)_2$ adhesives were prepared by following the procedures in Examples 2 and 3 except that MgO was replaced by magnesium carbonate hydroxide pentahydrate and the dry weight ratio between soy flour and $MgCO_3$—$Mg(OH)_2$ was 8:1. The total solids content of the resulting adhesive was 36%.

Example 6

Preparation of SF—CaO Adhesives

SF—CaO adhesives were prepared by following the procedures in Examples 2 and 3 except that MgO was replaced by CaO and the dry weight ratio between soy flour and CaO was 8:1. The total solids content of the resulting adhesive was 36%.

Example 7

Preparation of SF—$MgSO_4$ Adhesives

SF—$MgSO_4$ adhesives were prepared by following the procedure in Example 3 except that MgO was replaced by $MgSO_4$ and the dry weight ratio between soy flour and $MgSO_4$ was 8:1. The total solids content of the resulting adhesive was 36%.

Example 8

Preparation of SF—$TiO_2$ Adhesives

SF—$TiO_2$ adhesives were prepared by following the procedures in Example 3 except that MgO was replaced by $TiO_2$ and the dry weight ratio between soy flour and $TiO_2$ was 8:1. The total solids content of the resulting adhesive was 36%.

Example 9

Preparation of Plywood

One of the soy-based adhesives such as SF—MgO adhesive was applied to two sides of a white fir or yellow-poplar veneer (2 ft×2 ft; moisture content 12%) by a roller coater with the adhesive spread rate of about 8 mg/cm². For making 7-ply plywood, three adhesive-coated white fir veneers were stacked between two uncoated veneers in the following layout: maple/white fir/pine/white fir/pine/white fir/maple with the grain directions of two adjacent veneers perpendicular to each other. For making 5-ply plywood, two adhesive coated yellow poplar veneers were stacked between two uncoated yellow poplar veneers in the following layout: yellow poplar/yellow poplar/yellow poplar/yellow poplar yellow poplar with the grain directions of two adjacent veneers perpendicular to each other. The stacked 7-ply veneers and 5-ply veneers were put on a table for 5 minutes, cold-pressed at 100 psi for 5 minutes, put on a table again for 5 minutes and hot-pressed at 150 psi at 120° C. for 6.5 minutes. After hot-press, the panels were stored at ambient environment for at least 24 hours before it was evaluated for its shear strength and water-resistance.

Example 10

Three-Cycle Soak Test

The water-resistance of the plywood panels was determined with a three-cycle soak test in accord with the American National Standard for Hardwood and Decorative Plywood; Hardwood Plywood & Veneer Association; 2004 (ANSI/HPVA HP-1). The three-cycle soak test is the commonly accepted standard for evaluating the water-resistance of interior plywood (the type II plywood). The following is a detailed testing procedure defined by the standard. Twenty plywood specimens (2 in×5 in) cut from each plywood panel were soaked in water at 24±3° C. for 4 hours, and then dried at 49° C. to 52° C. for 19 hours. All specimens were inspected to see whether they were delaminated. This soaking/drying cycle was repeated until three cycles were completed. According to the standard, a plywood panel meets water-resistance requirement for interior applications if 95% of the specimens, i.e., 19 out of the 20 specimens do not delaminate after the first soaking/drying cycle and 85% of specimens, i.e., 17 out of 20 specimens do not delaminate after the third soaking/drying cycle. The ANSI/HPVA HP-1 specifically provides the following definition of delamination: any continuous opening between two layers has to be longer than two inches and deeper than 0.25 inch and wider than 0.003 inch.

Example 11

Two-Cycle Boil Test

Two-cycle boil test was performed in accord with the American National Standard for Hardwood and Decorative Plywood; Hardwood Plywood & Veneer Association; 2004 (ANSI/HPVA HP-1). The two-cycle boil test is one of the commonly accepted methods for evaluating the water-resistance of exterior plywood (the type I plywood). The following is a detailed testing procedure defined by the standard. Four 76 mm by 76 mm specimens from each panel shall be submerged in boiling water for 4 hours and then dried at a temperature of 63±3° C. for 20 hours with sufficient air circulation to lower the moisture content of the specimens to a maximum of 12 percent of the ovendry weight. They shall be boiled again for hours, dried for three hours at a temperature of 63±3° C., and then examined for delamination. Any observed delamination greater than 25.4 mm in continuous length constitutes failure of the specimens. Within any given lot of test samples, 90% of the individual specimens must pass.

Summary of Results

At the SF/MgO weight ratio of 10:1, both 5-ply and 7-ply panels bonded with the SF—MgO adhesive prepared from the procedure shown in Example 2 did not pass the three-cycle soak test (Table 1). However, at the same 10/1 SF/MgO weight ratio, no specimens from 5-ply and 7-ply panels bonded with the SF—MgO adhesive prepared from the procedure shown in Example 3 delaminated, i.e., both 5-ply and 7-ply panels passed the three-cycle soak test (Table 1). Both 5-ply and 7-ply panels each had one panel passed the two-cycle boil test, i.e., no specimen delaminated after the two-cycle boil test. At the 8/1 SF/MgO weight ratio, 5-ply or 7-ply panels bonded with SF—MgO adhesives prepared from procedures shown in either Example 2 or Example 3 had no specimen delaminated after the three-cycle soak test, i.e., both 5-ply and 7-ply panels passed the three-cycle soak test. The 5-ply and 7-ply panels bonded with SF—MgO adhesives prepared from the procedure shown in Example 3 all passed the two-cycle boil test, whereas 5-ply and 7-ply panels bonded with SF—MgO adhesives prepared from the procedure shown in Example 2 only each had one panel failed in the two-cycle boil test. All these results indicated that the preparation procedure shown in Example 3 was superior to that shown in Example 2. At 6/1 or 4/1 SF/MgO weight ratio, all 5-ply and 7-ply panels passed both three-cycle soak test and two-cycle boil test.

At the SF/Mg(OH)$_2$ weight ratio of 8:1, both 5-ply and 7-ply panels bonded with the SF—Mg(OH)$_2$ adhesive prepared from the procedure shown in Example 4 did not pass the three-cycle soak test. All specimens completely delaminated after the first soak cycle. At the SF/MgCO$_3$—Mg(OH)$_2$ weight ratio of 8:1, both 5-ply and 7-ply panels bonded with the SF—MgCO$_3$—Mg(OH)$_2$ adhesive prepared from the procedure shown in Example 5 did not pass the three-cycle soak test. All specimens completely delaminated after the first soak cycle. At the SF/CaO weight ratio of 8:1, the SF—CaO adhesive prepared from the procedure shown in Example 6 became big chunky materials and could not be coated onto veneer, even by hand. At the SF/MgSO$_4$ weight ratio of 8:1, both 5-ply and 7-ply panels bonded with the SF—MgSO$_4$ adhesive prepared from the procedure shown in Example 7 did not pass the three-cycle soak test. All specimens completely delaminated after the first soak cycle. At the SF/TiO$_2$ weight ratio of 8:1, both 5-ply and 7-ply panels bonded with the SF—TiO$_2$ adhesive prepared from the procedure shown in Example 8 did not pass the three-cycle soak test. All specimens completely delaminated after the first soak cycle.

TABLE 1

Effects of the preparation procedures and SF/MgO weight ratio on the water resistance of plywood panels bonded with SF-MgO adhesives.

| Preparation procedure | SF/MgO weight ratio | Panel | Panel number | number of specimens failed/total number of specimens in three-cycle soak test 1st cycle | number of specimens failed/total number of specimens in three-cycle soak test 3rd cycle | number of specimens failed/total number of specimens in two-cycle boil test 1st cycle | number of specimens failed/total number of specimens in two-cycle boil test 2nd cycle |
|---|---|---|---|---|---|---|---|
| Example 2 | 10/1 | 5-ply* | 1 | 1/20 | 5/20 | 1/4 | 1/4 |
|  |  |  | 2 | 2/20 | 7/20 | 4/4 | — |
|  |  | 7-ply** | 1 | 3/20 | 7/20 | 1/4 | 3/4 |
|  |  |  | 2 | 9/20 | 17/20 | 4/4 | — |
| Example 3 | 10/1 | 5-ply | 1 | 0/20 | 0/20 | 0/4 | 0/4 |
|  |  |  | 2 | 0/20 | 0/20 | 1/4 | 4/4 |
|  |  | 7-ply | 1 | 0/20 | 0/20 | 0/4 | 1/4 |
|  |  |  | 2 | 0/20 | 0/20 | 0/4 | 0/4 |
| Example 2 | 8/1 | 5-ply | 1 | 0/20 | 0/20 | 0/4 | 0/4 |
|  |  |  | 2 | 0/20 | 1/20 | 4/4 | 4/4 |
|  |  | 7-ply | 1 | 0/20 | 0/20 | 0/4 | 0/4 |
|  |  |  | 2 | 0/20 | 0/20 | 0/4 | 1/4 |
| Example 3 | 8/1 | 5-ply | 1 | 0/20 | 0/20 | 0/4 | 0/4 |
|  |  |  | 2 | 0/20 | 0/20 | 0/4 | 0/4 |
|  |  | 7-ply | 1 | 0/20 | 0/20 | 0/4 | 0/4 |
|  |  |  | 2 | 0/20 | 0/20 | 0/4 | 0/4 |
| Example 3 | 6/1 | 5-ply | 1 | 0/20 | 0/20 | 0/4 | 0/4 |
|  |  |  | 2 | 0/20 | 0/20 | 0/4 | 0/4 |
|  |  | 7-ply | 1 | 0/20 | 0/20 | 0/4 | 0/4 |
|  |  |  | 2 | 0/20 | 0/20 | 0/4 | 0/4 |
| Example 3 | 4/1 | 5-ply | 1 | 0/20 | 0/20 | 0/4 | 0/4 |
|  |  |  | 2 | 0/20 | 0/20 | 0/4 | 0/4 |
|  |  | 7-ply | 1 | 0/20 | 0/20 | 0/4 | 0/4 |
|  |  |  | 2 | 0/20 | 0/20 | 0/4 | 0/4 |

*5-ply = yellow poplar/yellow poplar/yellow poplar/yellow poplar/yellow poplar
**7-ply = maple/white fir/pine/white fir/pine/white fir/maple In view of the many possible embodiments to which the principles of the disclosed invention may be applied, it should be recognized that the illustrated embodiments are only preferred examples of the invention and should not be taken as limiting the scope of the invention.

What is claimed is:

1. An aqueous adhesive composition comprising (a) soy protein and (b) magnesium oxide, wherein components (a) and (b) are the only adhesive-active components in the composition, the magnesium oxide has an average particle size of less than 20 mesh, components (a) and (b) together constitute at least 75 weight percent of the composition, excluding the weight of the water, and the mix weight ratio of the soy protein to the magnesium oxide is 10:1 to 1:5, based on dry weight.

2. The composition of claim 1, wherein components (a) and (b) together constitute at least 90 weight percent of the composition, excluding the weight of the water.

3. The composition of claim 1, wherein the soy protein is selected from soy flour, soy protein concentrate, soy protein isolate, or a mixture thereof.

4. The composition of claim 1, wherein the composition has a solids content of 25 to 50 wt %.

5. The composition of claim 1, wherein the composition is heat-curable.

6. The composition of claim 1, wherein the mix weight ratio of the soy protein to the magnesium oxide is 8:1 to 4:1, based on dry weight.

7. The adhesive composition of claim 1, wherein the adhesive composition further comprises 0.5 weight percent, or less, of at least one additive selected from a borate, calcium oxide, and sodium hydroxide, based on dry weight.

8. The adhesive composition of claim 1, wherein the mix weight ratio of the soy protein to the magnesium oxide is 8:1 to 1:5, based on dry weight.

9. The adhesive composition of claim 1, further comprising a viscosity modifier.

10. The composition of claim 9, wherein the composition is formaldehyde-free.

11. The adhesive composition of claim 1, further comprising wheat flour.

12. The adhesive composition of claim 1, wherein the soy protein is soy flour.

13. The composition of claim 1, wherein the composition is formaldehyde-free.

14. An aqueous adhesive composition comprising the reaction product of (a) soy protein and (b) magnesium oxide, wherein components (a) and (b) are the only adhesive-active components in the composition, the magnesium oxide has an average particle size of less than 20 mesh, components (a) and (b) together constitute at least 75 weight percent of the composition, excluding the weight of the water, and the mix weight ratio of the soy protein to the magnesium oxide is 10:1 to 1:5, based on dry weight.

15. The adhesive composition of claim 14, wherein the mix weight ratio of the soy protein to the magnesium oxide is 8:1 to 1:5, based on dry weight.

16. The adhesive composition of claim 14, further comprising a viscosity modifier.

17. The adhesive composition of claim 14, further comprising wheat flour.

18. The composition of claim 14, wherein the soy protein is soy flour.

19. The composition of claim 14, wherein the composition is formaldehyde-free.

20. A lignocellulosic composite comprising at least one first lignocellulosic substrate adhered to at least one second lignocellulosic substrate via an adhesive composition, wherein the adhesive composition comprises a reaction product of (a) soy protein and (b) magnesium oxide, wherein components (a) and (b) together constitute at least 75 weight percent of the composition, excluding the weight of the water, the magnesium oxide has an average particle size of less than 20 mesh, and the mix weight ratio of the soy protein to the magnesium oxide is 10:1 to 1:5, based on dry weight.

21. The composite of claim 20, wherein the soy protein is selected from soy flour, soy protein concentrate, soy protein isolate, or a mixture thereof.

22. The composite of claim 20, wherein components (a) and (b) together constitute at least 95 weight percent of the adhesive composition.

23. The composite of claim 20, wherein components (a) and (b) together constitute at least 98 weight percent of the composition.

24. The composite of claim 20, wherein the lignocellulosic composite comprises a particleboard, oriented strand board, waferboard, fiberboard, parallel strand lumber, laminated strand lumber, plywood or laminated veneer lumber.

25. A method for making a lignocellulosic composite comprising:
   contacting at least one lignocellulosic substrate with the adhesive composition of claim 4; and
   bonding the adhesive-contacted lignocellulosic substrate to at least one other lignocellulosic substrate.

26. The method of claim 25 wherein the bonding comprises applying heat and pressure to an assembly of the adhesive-contacted lignocellulosic substrate and the other lignocellulosic substrate.

27. The method of claim 25, wherein the bonding cures the adhesive composition.

28. The method of claim 25, wherein the adhesive composition comprises a two part system that includes a first part comprising the soy protein and the magnesium oxide, and a second part comprising water, and the method further comprises mixing the first and second part together not more than about 48 hours prior to contacting the adhesive composition with the lignocellulosic substrate.

29. The method of claim 25, wherein the lignocellulosic substrates comprises comminuted lignocellulosic particles and the method comprises:
   blending about 1 to about 12 weight percent of the adhesive composition with a mixture of the comminuted lignocellulosic particles, the weight percent being based on the combined weight of the adhesive composition and the comminuted lignocellulosic particles;
   forming the adhesive/lignocellulosic particle blend into a predetermined configuration; and
   applying heat and pressure to the formed blend.

30. The method of claim 25, wherein the lignocellulosic substrates comprises a wood veneer substrate and the method comprises:
   applying the adhesive composition to at least one surface of the wood veneer substrate;
   forming an assembly of the adhesive-applied wood veneer substrates; and
   applying heat and pressure to the assembly.

31. The method of claim 28, wherein the first part comprises a powder mixture that includes soy protein powder and magnesium oxide powder.

32. The method of claim 31, wherein the soy protein powder and the magnesium oxide powder together constitute at least 95 weight percent of the first part.

33. The method of claim 28, wherein the mix weight ratio of the soy protein to the magnesium oxide is 8:1 to 4:1, based on dry weight.

34. The method of claim 25, wherein the soy protein is selected from soy flour, soy protein concentrate, soy protein isolate, or a mixture thereof.

35. A method for making a formaldehyde-free aqueous adhesive composition comprising:
   mixing together (a) soy protein powder and (b) magnesium oxide powder to form a powder mixture, wherein components (a) and (b) together constitute at least 75 weight percent of the composition, excluding the weight of the water, and the mix weight ratio of the soy protein to the magnesium oxide is 10:1 to 1:5, based on dry weight, components (a) and (b) are the only adhesive-active components in the composition, and the magnesium oxide has an average particle size of less than 20 mesh; and
   mixing the resulting powder mixture with water.

36. The method of claim 25, wherein the lignocellulosic substrate has a moisture content of 6 to 8%.

* * * * *